(12) United States Patent
Monahan et al.

(10) Patent No.: US 7,021,440 B2
(45) Date of Patent: Apr. 4, 2006

(54) ELECTRONIC LOCKING CLUTCH WITH LOCK INDICATION DEVICE

(75) Inventors: Russell Monahan, Ann Arbor, MI (US); Shiro Goto, Plymouth, MI (US)

(73) Assignee: NTN Corporation, Osaka (JP)

( * ) Notice: Subject to any disclaimer, the term of this patent is extended or adjusted under 35 U.S.C. 154(b) by 59 days.

(21) Appl. No.: 10/919,928

(22) Filed: Aug. 17, 2004

(65) Prior Publication Data

US 2006/0037828 A1   Feb. 23, 2006

(51) Int. Cl.
*F16D 41/08* (2006.01)
(52) U.S. Cl. .......................... 192/35; 192/44
(58) Field of Classification Search .................. 192/35, 192/44
See application file for complete search history.

(56) References Cited

U.S. PATENT DOCUMENTS

| | | | |
|---|---|---|---|
| 4,340,133 A | 7/1982 | Blersch | |
| 4,949,828 A | 8/1990 | Olsen | |
| 5,265,707 A * | 11/1993 | Abe et al. | 192/47 |
| 5,275,253 A | 1/1994 | Sperduti et al. | |
| 5,465,819 A | 11/1995 | Weilant et al. | |
| 5,867,092 A | 2/1999 | Vogt | |
| 6,302,251 B1 | 10/2001 | Fair et al. | |
| 6,334,832 B1 | 1/2002 | Heravi et al. | |
| 6,349,809 B1 | 2/2002 | Isley, Jr. | |
| 6,367,344 B1 | 4/2002 | Vogt et al. | |
| 6,913,107 B1* | 7/2005 | Sato et al. | 180/402 |
| 2003/0019711 A1 | 1/2003 | Nekado et al. | |
| 2005/0194969 A1* | 9/2005 | Koike et al. | 324/207.25 |

\* cited by examiner

*Primary Examiner*—Saul Rodriguez
(74) *Attorney, Agent, or Firm*—Brinks Hofer Gilson & Lione

(57) ABSTRACT

An over-running clutch includes an outer race and an inner race defining a gap therebetween. A plurality of rolling elements are positioned between the inner and outer races. A retainer interconnects the rolling elements. A first biasing element biases the retainer to hold the rolling elements such that the inner and outer races are free to rotate relative to one another. An actuator selectively forces the rolling elements to a position where the rolling elements engage and wedge between the inner and outer races, thereby locking the clutch. A sensor is adapted to detect the engagement of the clutch and to send a corresponding signal.

10 Claims, 5 Drawing Sheets

ELECTRONIC LOCKING CLUTCH WITH LOCK INDICATION DEVICE

TECHNICAL FIELD OF THE INVENTION

This invention is related to a two way over-running clutch. More specifically, the present invention relates to a two-way over-running clutch assembly of a roller/ramp variety, which includes a lock indication device that sends a signal to indicate if the over-running clutch is engaged.

BACKGROUND OF THE INVENTION

Differential assemblies are used in motor vehicles to allow the wheels to turn at different rotational speeds while still providing power to the wheels. Various types of differential assemblies are used to redirect the transfer of power to the driving axles.

In a standard open differential, as a vehicle turns, power is provided through a pinion and ring gear to the differential housing. As the inner and outer wheels trace paths of different radii, side gears attached to right and left axle half shafts are allowed to turn at different speeds by their interconnection through intermediate spider gears, which rotate with the housing.

As long as traction is maintained between the drive wheels and the road surface, the power is properly distributed to the wheels through the differential assembly. However, when traction is reduced or lost altogether at one or both wheels, a standard open differential assembly will cause one wheel to spin uselessly, providing little tractive power to the wheels. For instance, if one tire is on ice or some other slippery surface and the other tire is on dry pavement, slip will occur at the low friction side and the torque applied to the non-slipping tire will be limited to the torque generated at the slipping tire. In such circumstances, very little power will be delivered to the wheel on the dry pavement and the vehicle will not be powered forward or backward. Therefore, there is a need to lock the axle half shafts together in certain situations causing both wheels to spin at about the same speed, irrespective of differing coefficients of friction encountered by the drive wheels.

It is known in the art to selectively lock other drivetrain components using roller/ramp clutch assemblies. For example, the two-way over-running clutch assembly described in U.S. Pat. No. 5,927,456, and which is hereby incorporated by reference, describes a clutch assembly of a roller/ramp variety and the mechanism by which the rollers are retained and biased in the assembly. In addition, the rotation transmission device described in U.S. Pat. No. 5,924,510, also hereby incorporated by reference, discloses a device which includes a clutch assembly mounted in the transfer case of a four-wheel drive vehicle that can selectively transmit a driving torque.

Typically, these types of over-running clutches must include complex sensors to determine when the clutch is engaged and to send a signal to the operator of the vehicle indicating engagement status. Therefore, there is a need for an over-running clutch of the type described above that includes a simple, reliable lock indication device that will send a signal to the operator of the vehicle, or to the electronic control unit, indicating that the clutch is either engaged or disengaged.

BRIEF SUMMARY OF THE INVENTION

In accordance with an aspect of the present invention an over-running clutch assembly comprises an outer race having a cylindrical inner surface and being rotatable about an axis and a case end enclosing a first end of the outer race, an inner race having a segmented (flat or slightly concave) outer surface coaxial with the cylindrical inner surface and defining a gap therebetween. The inner race is rotatable about the axis with rotational movement relative to the outer race. A plurality of ramp surfaces formed at spaced apart locations on the outer surface define a plurality of cammed surfaces on the outer surface of the inner race. A plurality of rollers are positioned between the outer race and the inner race with one of the rollers being located centrally within each of the cammed surfaces and each of the rollers having a diameter less than the gap between the center of the cammed surface on the inner race and the cylindrical inner surface of the outer race. A retainer interconnects all of the rollers and causes the rollers to circumferentially move in unison with one another. The retainer is rotatable about the axis with limited relative rotation with respect to the inner race.

A first biasing element is supported on the retainer to radially bias the retainer position relative to the inner race such that each of the rollers is held in the center of the flat cammed surfaces on the inner race. An actuation disk is connected to the retainer by a means which allows some axial movement of the actuation disk with respect to the retainer toward the case end. The preferred method would include a series of retainer tabs extending axially from one end of the retainer and notches which are adapted to engage the retainer tabs, thereby preventing circumferential or relative rotational motion of the actuation disk relative to the retainer and allowing axial motion of the actuation disk relative to the retainer. There are at least two, and preferably four, tabs extending outward to engage notches within the actuation disk. A second biasing element is disposed between the actuation disk and the inner axial surface of the case end to bias the actuation disk away from the case end.

The clutch assembly includes an actuator to selectively overcome the second biasing element to force the actuation disk into contact with the case end, wherein rotation of the outer race and case end with respect to said inner race is frictionally transferred to the actuation disk and the retainer, overcoming the first biasing element, thereby moving the rollers along the ramp surfaces to a position where the rollers engage and wedge between the inner and outer races to prevent relative rotation between the inner and outer races.

Further, the over-running clutch includes a sensor that detects the proximity of the actuation disk relative to the inner surface of the case end, and sends a corresponding signal to indicate that the over-running clutch is engaged or disengaged.

A lock indicator ring is mounted onto the actuation disk. The lock indicator ring includes at least one axially extending lobe that extends into one of the slots formed within the case end. The axial lobe includes at least one magnet mounted onto a distal end thereof. When the actuation disk is magnetically drawn toward the case end the distal end of the axial lobe comes into close proximity with the sensor. The sensor senses the presence of the magnet and sends a corresponding signal.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 1:
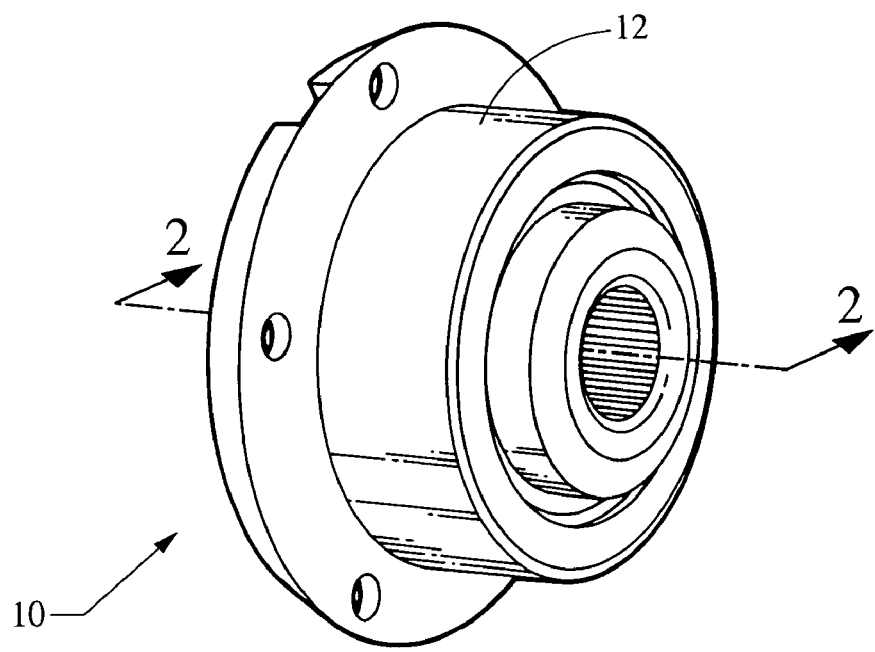
FIG. 1 is a perspective view of an over-running clutch of the present invention.
Figure 3:
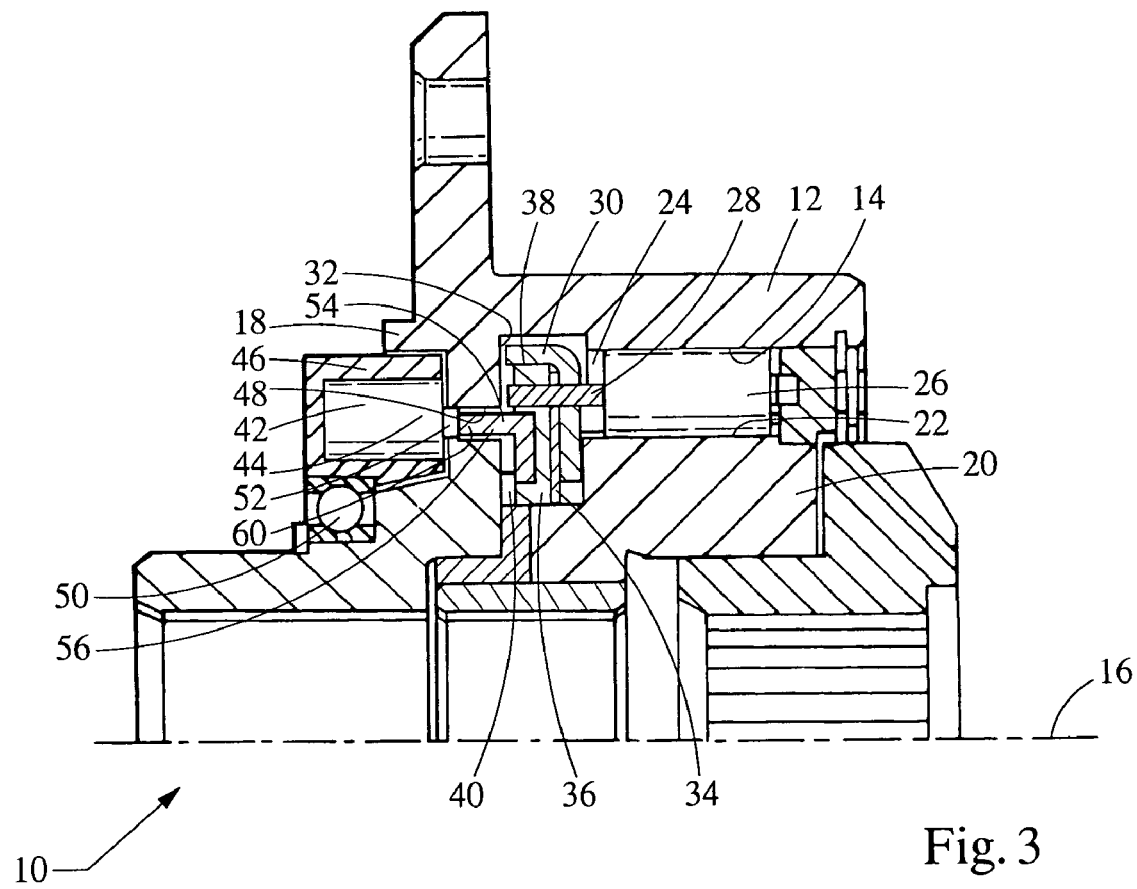
FIG. 3 is a enlarged portion of FIG. 2 as indicated by circle 3 of FIG. 2.
Figure 2:
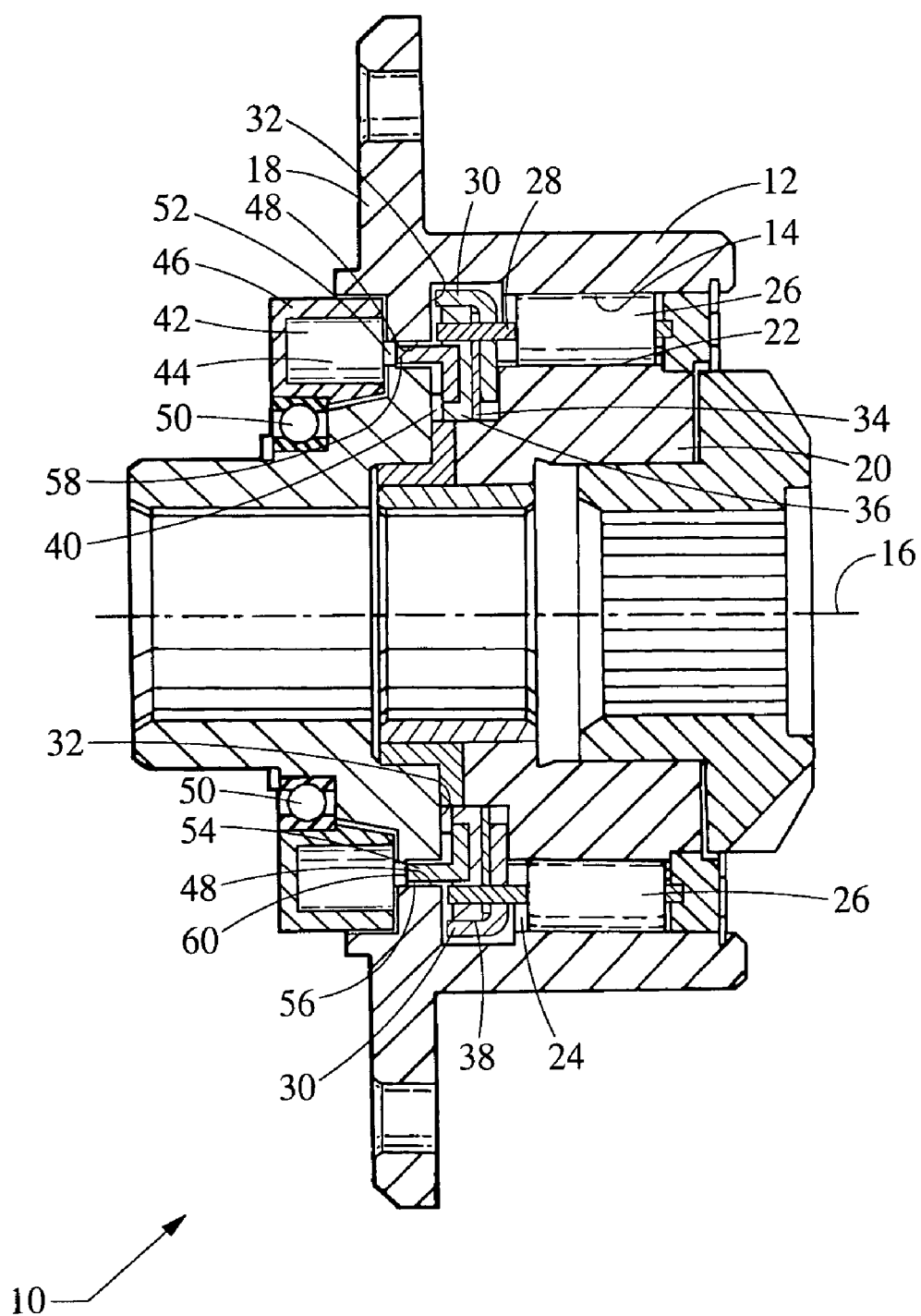
FIG. 2 is a sectional view taken along line 2—2 of FIG. 1.

Referring to FIGS. 1–3, and over-running clutch of the present invention is shown generally at 10. The over-running clutch 10 includes an outer race 12 having an inner surface 14 that is rotatable about a first axis 16 and a case end 18. An inner race 20 includes a cammed outer surface 22 coaxial with the inner surface 14 of the outer race 12. The inner surface 14 of the outer race 12 and the outer surface 22 of the inner race 20 define a gap 24 between the inner race 20 and the outer race 12.

A plurality of rolling elements 26 are positioned within the gap 24. Preferably, the rolling elements 26, the inner race 20 and the outer race 12 are made from steel. Due to the high hertzian contact stresses experienced by the rolling elements 26, the inner surface 14 of the outer race 12 and the outer surface 22 of the inner race 20, and the rolling elements 26 are preferably hardened and ground, and made of steel.

The cammed outer surface 22 of the inner race 20 is defined by a plurality of ramp surfaces (not shown) that are formed at spaced apart locations along the outer surface 22. The rolling elements 26 are positioned between the outer race 12 and the inner race 20 with one rolling element 26 being located at the center of each of the ramp surfaces of the inner race 20. The rolling elements 26 have a diameter which is smaller than the gap 24 between the inner surface 14 and the midpoint of the ramp surfaces 23, but greater than the gap 24 between the outer portions of the ramp surfaces 23 and the inner surface 14.

A retainer 28 interconnects all of the rolling elements 26 and causes the rolling elements 26 to circumferentially move in unison with one another. The retainer 28 is rotatable about the first axis 16 with limited relative rotation with respect to the inner race 20. The retainer 28 also includes a pair of retainer tabs 30 extending axially toward an inner surface 32 of the case end 18. A distal end of each of the retainer tabs 32 is located adjacent the inner surface 32 of the case end 18 at a distance from the case end 18.

A first biasing element 34 is mounted onto the retainer 28 to maintain the position of the retainer 28 with respect to the inner race 20 such that the rolling elements 26 are normally held in the middle of the ramp surfaces. An actuation disk 36 is disposed between the retainer 28 and the inner surface 32 of the case end 18. The actuation disk 36 has an outer diameter and an inner diameter. The outer diameter of the actuation disk 36 includes notches 38 that engage the tabs 30 of the retainer 28. In this way, the actuation disk 36 is linked to the retainer 28 such that rotational motion of the actuation disk 36 relative to the retainer 28 is prevented and axial motion of the actuation disk 36 relative to the retainer 28 is allowed.

A second biasing element 40 is disposed between the actuation disk 36 and the inner surface 32 of the case end 18 to bias the actuation disk 36 away from the case end 18 and toward the retainer 28. Preferably, the second biasing element 40 is a wave spring.

Preferably, the first biasing element 34 is a centering spring supported by the inner race 20 and engaging the retainer 28 to keep the retainer 28 in position to keep the rolling elements 26 positioned at the center of the ramp surfaces of the inner race 20 thereby allowing the outer race 12 and the inner race 20 to rotate freely with respect to one other. The first biasing element 34 includes a plurality of small tangs (not shown) extending radially in or out to engage small notches (not shown) on the retainer 28. The biasing force of the first biasing element 34 must be carefully calibrated for the over-running clutch 10. The first biasing element 34 must provide enough force to move the retainer 28 and rolling elements 26 to the neutral position easily when the over-running clutch 10 is dis-engaged, but not so much force that friction between the actuation disk 36 and the case end 18 cannot overcome it to actuate the clutch 10.

The over-running clutch 10 includes an actuator 42 to selectively overcome the second biasing element 40 and force the actuation disk 36 into contact with the case end 18. Since the actuation disk 36 is free to move axially with respect to the retainer 28, when the attractive force of the actuator 42 overcomes the force of the second biasing element 40, the actuation disk 36 will move axially toward the inner surface 32 of the case end 18 until the actuation disk 36 and the inner surface 32 of the case end 18 come into contact with one another. When the actuation disk 36 and the case end 18 are brought into contact with one another, the relative rotational motion of the outer race 12 and the case end 18 with respect to the inner race 20 will frictionally be transferred to the actuation disk 36. The actuation disk 36 is linked rotationally and circumferentially to the retainer 28, therefore the rotational movement of the outer race 12 and the case end 18 will be transferred through the actuation disk 36 and to the retainer 28.

Rotational movement of the retainer 28 with respect to the inner race 20 moves the rolling elements 26 along the ramp surfaces 23 until the rolling elements 26 are no longer positioned at the centers of the ramp surfaces 23. Since the gap 24 is not large enough to accommodate the diameter of the rolling elements 26 when the rolling elements 26 move out of the centers of the ramp surfaces, the rolling elements 26 become wedged between the outer surface 22 of the inner race 20 and the inner surface 14 of the outer race 12. This rotationally locks the inner race 20 and outer race 12 together. The ramp surfaces 23 and the interaction of the ramp surfaces 23 with the rolling elements 26 are described in detail in U.S. Pat. Nos. 5,927,456 and 5,924,510 which are both hereby incorporated by reference into the present application.

Preferably, the actuator 42 comprises an electromagnetic coil 44 held within a housing 46 mounted to an exterior structure (not shown). The case end 18 includes a plurality of partially circumferential slots 48 extending through the case end 18 and spaced radially about the case end 18. When energized, the electromagnetic coil 44 produces a magnetic flux which is focused around the slots 48 and concentrated on the actuation disk 36. When the magnetic flux passes through the actuation disk 36, the actuation disk 36 is magnetically drawn toward the inner surface 32 of the case end 18. Once the magnetic force of the electromagnetic coil 44 overcomes the force of the second biasing element 40, the actuation disk 36 will start to move toward the inner surface 32 of the case end 18. It is to be understood, that the present invention could be practiced with an actuator 42 of some other type. The actuation disk 36 could be moved through hydraulic or pneumatic means as well as through electromagnetic means.

When the actuator 42 is de-energized, the magnetic attraction of the actuation disk 36 to the inner surface 32 of the case end 18 dissipates. As this attraction dissipates, the second biasing element 40 quickly overcomes the dissipating magnetic attraction and forces the actuation disk 36 back away from the inner surface 32 of the case end 18, thereby eliminating the frictional transfer of rotation to the actuation disk 36.

Without a rotational force to pull the retainer 28 and rolling elements 26 out of the neutral position, the first biasing element 34 will force the retainer 28 back into the neutral position and the rolling elements 26 back into the middle of the ramp surfaces, thereby allowing the outer race 12 to rotate freely with respect to the inner race 20, and un-locking the over-running clutch 10.

Preferably, the housing 46 for the electromagnetic coil 44 is mounted to a stationary structure (not shown) and is located with respect to the case end 18 by a bearing 50. The bearing 50 can be a ball, roller or journal bearing and will allow the electromagnetic coil 44 and the housing 46 to remain stationary. This will allow wiring to the electromagnetic coil 44 to be simplified because an electrical connection to a rotating body is not required. Any means suitable to allow relative rotational movement between the housing 46 and the exterior surface of the case end 18 is adequate.

The over-running clutch further includes a sensor 52 that detects the proximity of the actuation disk 36 relative to the inner surface 32 of the case end 18, and sends a corresponding signal to indicate that the over-running clutch 10 is engaged or disengaged. The sensor 52 is mounted close to the radial mid-point of the coil face to balance the magnetic field sensing. A lock indicator ring 54 is mounted onto the actuation disk 36. The lock indicator ring 54 includes at least one axially extending lobe 56 that extends into one of the slots 48 formed within the case end 18. The axial lobe 56 includes at least one magnet 58 mounted onto a distal end 60 thereof. The sensor 52 is mounted onto the electromagnetic coil 44 adjacent the case end 18 and aligned with the slot 48 in the case end 18. When the actuation disk 36 is magnetically drawn toward the case end 18, the distal end 60 of the axial lobe 56 comes into close proximity with the sensor 52 on the electromagnetic coil 44. The sensor 52 senses the presence of the magnet 58 mounted onto the distal end 60 of the axial lobe 56 and sends a corresponding signal.

Figure 4:
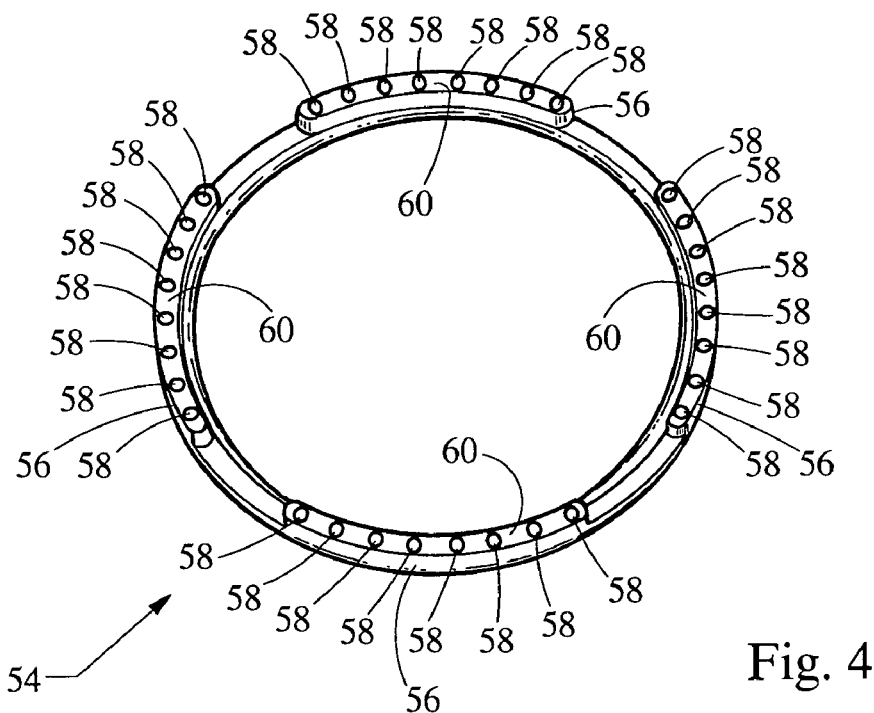
FIG. 4 is a perspective view of a lock indicator ring of the present invention having a plurality of magnets mounted onto axial lobes.
Figure 5:
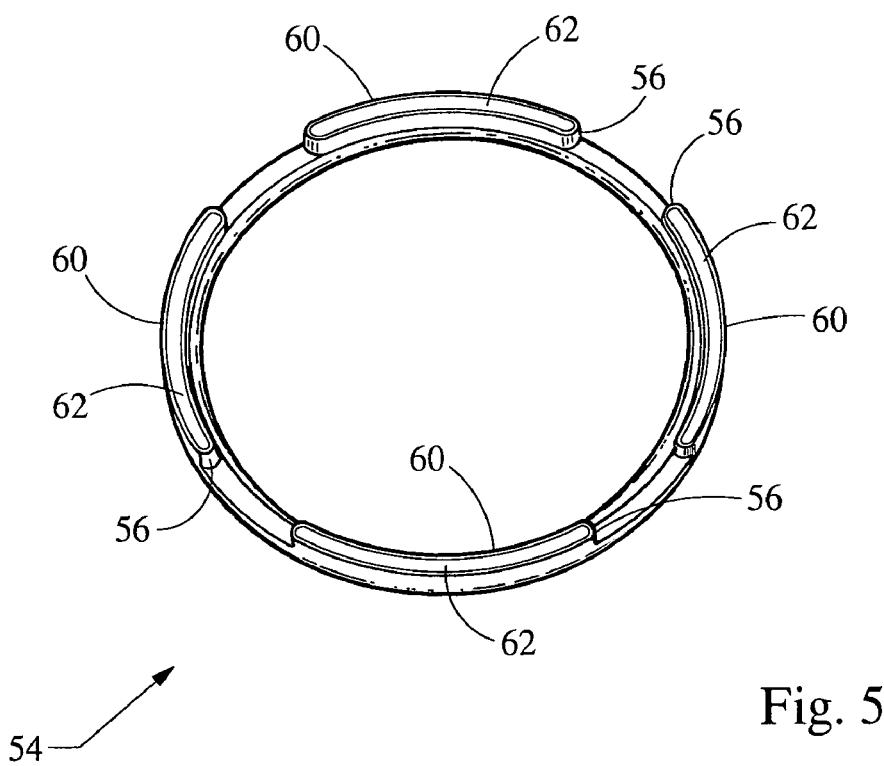
FIG. 5 is a perspective view of a lock indicator ring of the present invention having magnetic strips mounted onto axial lobes.

Prefereably, the case end 18 includes a plurality of slots 48, and the lock indicator ring 54 includes a plurality of axial lobes 56. Referring to FIGS. 4 and 5, a lock indicator ring 54 having four axial lobes 56 is shown. The lock indicator ring 54 can include a plurality of magnets 58 mounted onto the distal end 60 of each of the axial lobes 56 and spaced therebout, as shown in FIG. 4. Alternatively, the lock indicator ring 54 can include a single magnetic strip 62 mounted to the distal end 60 of each axial lobe 56 extending along the length of the axial lobe 56, as shown in FIG. 5.

Figure 6:
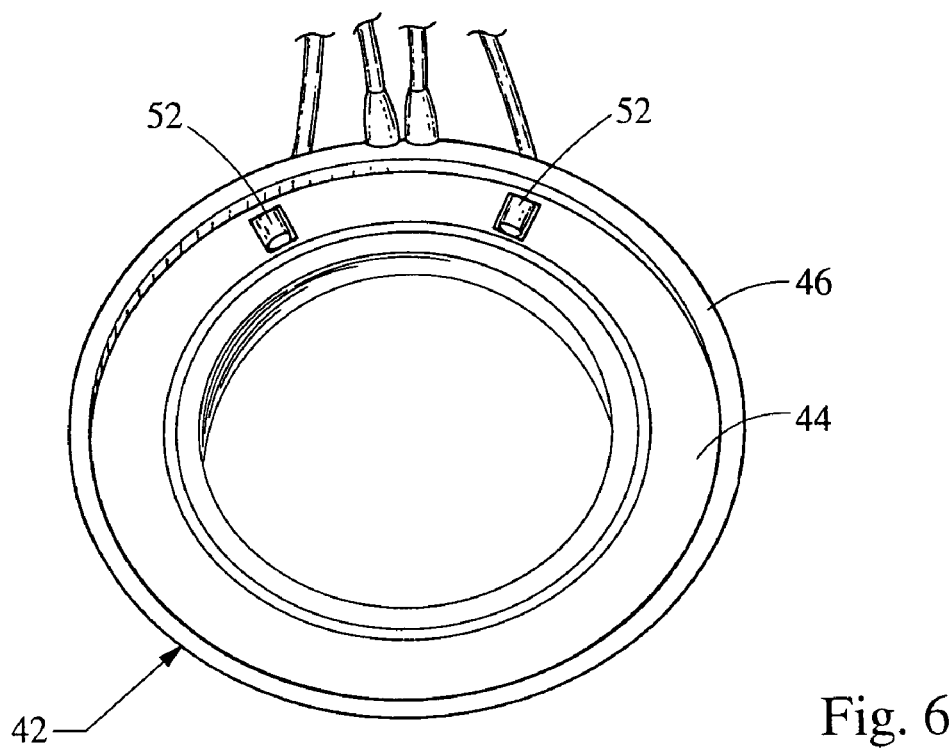
FIG. 6 is a perspective view of an electromagnetic coil mounted within a housing having a pair of sensors mounted therein.
Figure 7:
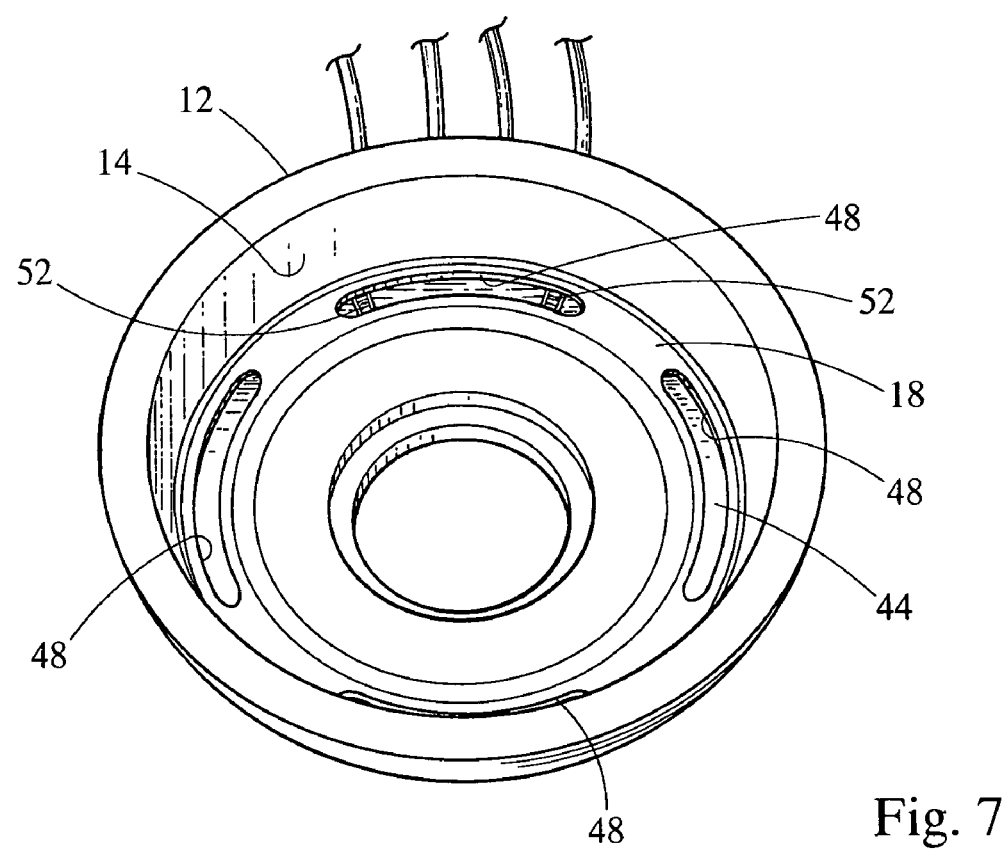
FIG. 7 is a perspective view of a portion of a case end of the over-running clutch having the electromagnetic coil and housing mounted thereon.
Figure 8:
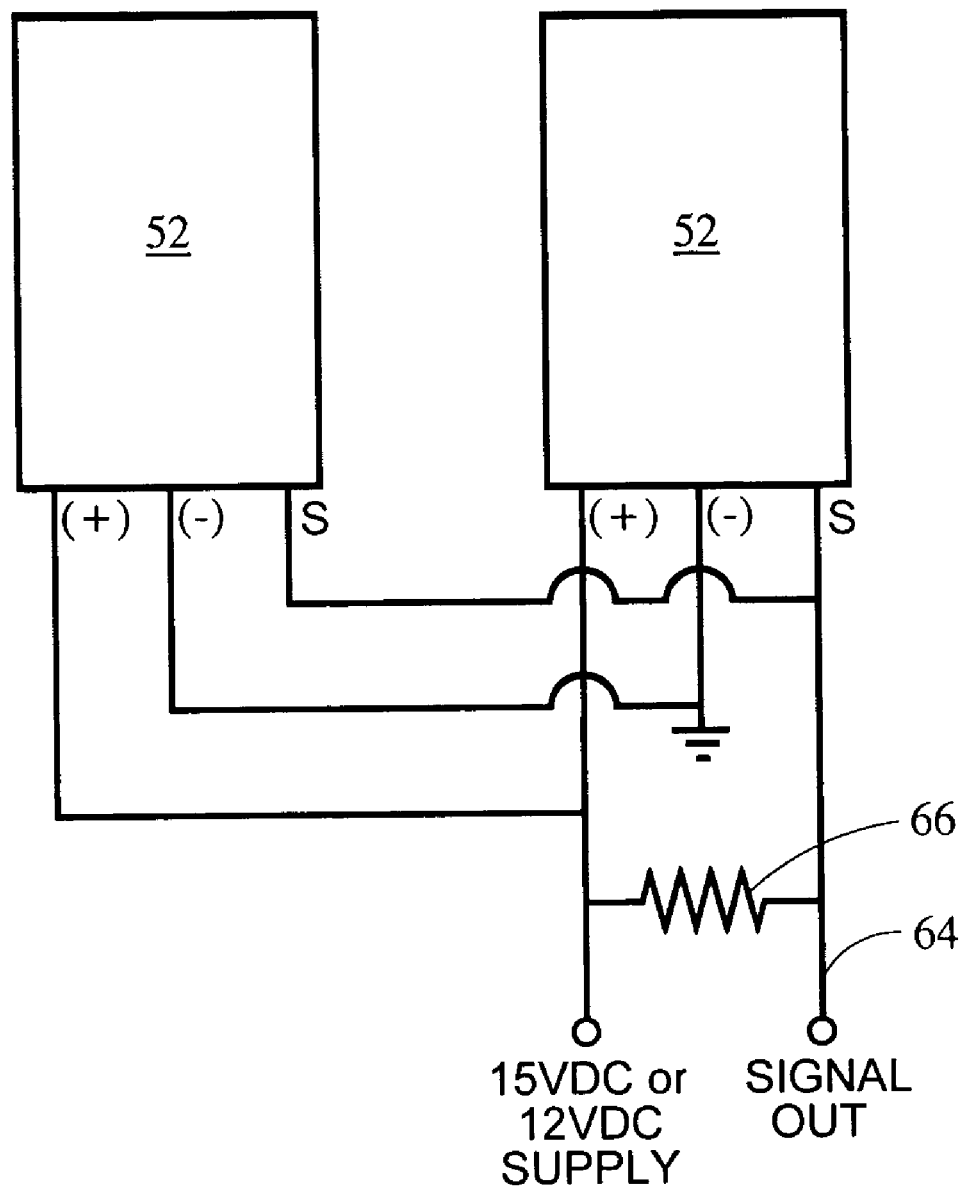
FIG. 8 is schematic diagram of the electrical circuit for the sensors of the present invention.

Referring to FIG. 6, preferably, the sensor 52 comprises a pair of Hall effect sensors 52 spaced apart from one another and mounted within the electromagnetic coil 44. The sensors 52 are aligned with opposite ends of one of the slots 48 formed within the case end 18, as shown in FIG. 7. Preferably, the sensors 52 are unipolar Hall effect sensors. The sensors 52 should be spaced by at least the angular distance between opposite ends of one of the slots 48 in the case end 18. The Hall effect sensors 52 are wired in parallel so that at least one of the sensors 52 is triggered at any time to provide a continuous signal even when gaps in the axial lobes 56 and the magnets 58 are in close proximity to the other Hall effect sensor 52. Further, the outputs of the Hall effect sensors 52 can be tied together to a common output 64. Referring to FIG. 8, a "pull-up" resistor 66 is used to bring the "high" signal up to the supply voltage. This circuit layout provides a fail safe normal "high" signal for the disengaged position, and results in a "low" signal whenever one or both of the Hall effect sensors 52 are activated.

The sensors 52 are placed on the electromagnetic coil at a position where the sensors 52 will not be automatically triggered whenever the electromagnetic coil 44 is energized. Further, the direction of the polarization of the electromagnetic coil 44 is such that the field generated by the electromagnetic coil 44 does not overcome the opposing fields of the magnets 58 on the axial lobes 56 of the lock indicator ring 54 to prevent the sensors 52 from triggering.

When the over-running clutch 10 is not actuated, the magnets 58 are shielded within the ferrous structure of the case end 18 and the magnetic fields are short-circuited and do not extend sufficiently forward toward the sensors 52. When the over-running clutch 10 is actuated, the axial lobes 56 are moved forward such that the distal ends 60 of the axial lobes 56 extend beyond the slots 48 within the case end 18, thereby exposing the sensors 52 to the magnetic fields of the magnets 58. While the distance that the magnets 58 moves is minimal, only about 1.4 millimeters, the release of the shielding effect as the magnets 58 extend beyond the slots 48 in the case end 18 causes a dramatic increase in the magnetic field that the sensors 52 are exposed to. Therefore, the over-running clutch 10 can be manufactured with relatively wide tolerances, thereby reducing overall costs and making manufacturing easier, while providing a robust and reliable lock indication signal.

The foregoing discussion discloses and describes various aspects of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

The invention claimed is:
1. An over-running clutch comprising:
an outer race having a cylindrical inner surface and a case end enclosing one end of said outer race, said outer race being rotatable about a first axis;

an inner race having an outer surface coaxial with said cylindrical inner surface and defining a gap between said outer surface and said cylindrical inner surface, said inner race being rotatable about said first axis with allowable rotational movement relative to said outer race;

a plurality of ramp surfaces formed at spaced apart locations about said outer surface of said inner race, said ramp surfaces defining a plurality of cam surfaces on said outer surface of said inner race;

a plurality of rolling elements positioned between said outer race and said inner race, said rolling elements having a diameter less than said gap between said cylindrical inner surface and the midpoint of said cam surfaces;

a retainer interconnecting all of said rolling elements and causing said rolling elements to circumferentially move in unison with one another, said retainer being rotatable about said first axis with limited relative rotation with respect to said inner race, said retainer including a plurality of retainer tabs extending axially toward an axial inner surface of said case end, a distal end of each of said retainer tabs being adjacent and spaced from said inner surface of said case end;

a first biasing element supported on said inner race to radially bias said retainer so as to hold each of said rolling elements onto the midpoints of said cam surfaces when said clutch is not engaged;

an actuation disk having an outer diameter, an inner diameter and a thickness, disposed between said retainer and said inner surface of said case end, said actuation disk further including a plurality of notches located radially about one of said inner diameter and said outer diameter, said notches to engaging said retainer tabs thereby preventing rotational motion of said actuation disk relative to said retainer and allowing axial motion of said actuation disk relative to said retainer;

a second biasing element disposed between said actuation disk and said inner surface of said case end to bias said actuation disk away from said case end and toward said retainer;

an actuator to selectively overcome said second biasing element to force said actuation disk into contact with said case end, wherein rotation of said outer race and said case end with respect to said inner race is frictionally transferred to said actuation disk and said retainer, thereby overcoming said first biasing element and moving said rollers along said ramp surfaces to a position where said rollers engage and wedge between said inner and outer races to prevent relative rotation between said inner and outer races; and a sensor adapted to detect the proximity of said actuation disk relative to said case end and to send a corresponding signal.

2. The over-running clutch of claim 1 wherein said actuator comprises an electromagnetic coil held within a housing and located with respect to said case end by a bearing to allow said case end and said outer race to rotate independently of said housing, said case end including slots spaced radially thereabout, wherein a magnetic flux is focused around said slots to said actuation disk when said electromagnetic coil is energized, thereby magnetically attracting said actuation disk toward said inner surface of said case end.

3. The over-running clutch of claim 2 wherein said actuation disk includes a lock indicator ring mounted thereon, said lock indicator ring including at least one axial lobe extending into one of said slots within said case end, said at least one axial lobe including at least one magnet mounted onto a distal end thereof such that when said magnetic coil is actuated and said actuation disk is magnetically drawn toward said case end, said at least one lobe extends toward and into close proximity with said electromagnetic coil, said sensor being mounted onto said electromagnetic coil and aligned with said slot to detect the presence of said at least one magnet and to send a corresponding signal.

4. The over-running clutch of claim 3 wherein said at least one sensor is a hall effect sensor.

5. The over-running clutch of claim 3 wherein said at least one sensor is a pair of hall effect sensors spaced apart from one another such said hall effect sensors are aligned with opposite ends of said slot.

6. The over-running clutch of claim 5 further including a resistor, wherein said hall effect sensors are wired in parallel.

7. The over-running clutch of claim 6 wherein outputs of each Hall effect sensor are connected together to a common output, said over-running clutch further including a resistor connected between a power input for the sensors and said common output.

8. The over-running clutch of claim 3 wherein said at least one magnet comprises a plurality of magnets spaced along said distal end of said axial lobe.

9. The over-running clutch of claim 3 wherein said at least one magnet comprises a single strip mounted onto the distal end of said axial lobe and extending along the length of the axial lobe.

10. The over-running clutch of claim 1 wherein said first biasing element is a centering spring held in place between said inner race and said retainer to bias said retainer into a neutral position wherein the rolling elements are held at the midpoints of said cammed surfaces, when said clutch is not engaged.

* * * * *